(12) United States Patent
Yamanaka et al.

(10) Patent No.: US 9,056,285 B2
(45) Date of Patent: *Jun. 16, 2015

(54) GAS SEPARATION MEMBRANE

(71) Applicant: Central Glass Company, Limited, Ube-shi, Yamaguchi (JP)

(72) Inventors: Kazuhiro Yamanaka, Tachikawa (JP); Takeshi Suda, Fujimino (JP); Hiroki Uoyama, Saitama (JP)

(73) Assignee: Central Glass Company, Limited, Ube-shi (JP)

( * ) Notice: Subject to any disclaimer, the term of this patent is extended or adjusted under 35 U.S.C. 154(b) by 120 days.

This patent is subject to a terminal disclaimer.

(21) Appl. No.: 13/868,663

(22) Filed: Apr. 23, 2013

(65) Prior Publication Data

US 2014/0144325 A1    May 29, 2014

(30) Foreign Application Priority Data

Nov. 28, 2012    (JP) ................... 2012-260191

(51) Int. Cl.
*B01D 71/64* (2006.01)
*B01D 53/22* (2006.01)
*C08L 79/08* (2006.01)
*C08G 73/10* (2006.01)
*B01D 67/00* (2006.01)
*B01D 71/82* (2006.01)

(52) U.S. Cl.
CPC ............ *B01D 71/64* (2013.01); *C08G 73/1071* (2013.01); *C08L 79/08* (2013.01); *B01D 53/228* (2013.01); *B01D 67/0093* (2013.01); *B01D 71/82* (2013.01); *B01D 2325/022* (2013.01)

(58) Field of Classification Search
CPC ...... B01D 53/228; B01D 71/64; B01D 71/82; B01D 67/0093; B01D 2235/022; C08L 79/08; C08L 73/1071
USPC ........... 96/4, 14; 95/45, 51, 53; 528/125, 172, 528/188, 353; 525/423, 434
See application file for complete search history.

(56) References Cited

U.S. PATENT DOCUMENTS

| | | | |
|---|---|---|---|
| 3,133,132 A | 5/1964 | Loeb et al. | |
| 5,266,100 A | 11/1993 | Simmons | |
| 5,320,650 A * | 6/1994 | Simmons | 96/14 |
| 5,391,219 A * | 2/1995 | Matsumoto et al. | 95/51 |
| 5,647,894 A * | 7/1997 | Ohara et al. | 96/14 |
| 5,690,870 A | 11/1997 | Hachisuka et al. | |
| 2009/0292104 A1* | 11/2009 | Saegusa et al. | 528/331 |
| 2010/0029895 A1 | 2/2010 | Narizuka et al. | |
| 2011/0232484 A1* | 9/2011 | Yoshinaga et al. | 95/45 |

FOREIGN PATENT DOCUMENTS

| | | |
|---|---|---|
| CA | 2834670 A1 | 12/2012 |
| JP | 63-190607 A | 8/1988 |
| JP | 3-274693 A | 12/1991 |
| JP | 4-93389 A | 3/1992 |
| JP | 5-194338 A | 8/1993 |
| JP | 7-132216 A | 5/1995 |
| JP | 8-501978 A | 3/1996 |
| JP | 8-173778 A | 7/1996 |

(Continued)

OTHER PUBLICATIONS

Japanese-language International Search Report (PCT/ISA/210) for PCT/JP2013/081700 dated Jan. 21, 2014 (three (3) pages).
Japanese-Language Written Opinion (PCT/ISA/220 & PCT/ISA/237) PCT/JP2013/081700 dated Jan. 21, 2014 (Six (6) pages).

(Continued)

*Primary Examiner* — Jason M Greene
(74) *Attorney, Agent, or Firm* — Crowell & Moring LLP

(57) ABSTRACT

A gas separation membrane having a polyimide structure. The polyimide structure is provided to contain a repeating unit represented by general formula (1):

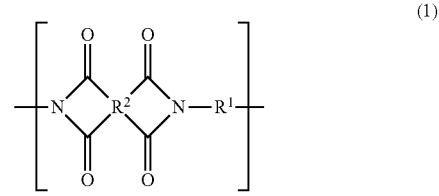

(1)

wherein $R^1$ is a divalent organic group represented by general formula (2):

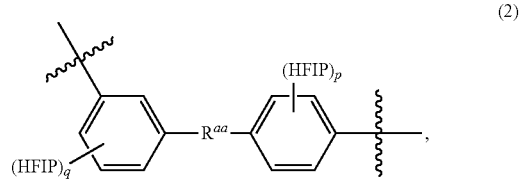

(2)

or a divalent organic group represented by general formula (3):

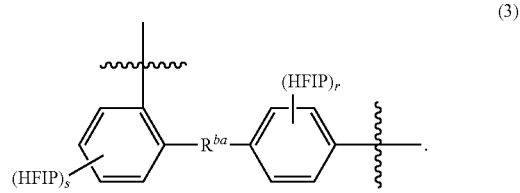

(3)

14 Claims, No Drawings

(56) References Cited

FOREIGN PATENT DOCUMENTS

| | | |
|---|---|---|
| JP | 11-343414 A | 12/1999 |
| JP | 2002-105034 A | 4/2002 |
| JP | 2007-119503 A | 5/2007 |
| JP | 2007-119504 A | 5/2007 |
| JP | 2008-150534 A | 7/2008 |
| JP | 2009-149787 A | 7/2009 |
| JP | 2009-235048 A | 10/2009 |
| JP | 2011-161396 A1 | 8/2011 |
| WO | WO 2012/165455 A1 | 12/2012 |

OTHER PUBLICATIONS

Kenichi Okamoto et al., "Polymer Application", 1992, p. 16, vol. 41, No. 1.
S. Alexander Stern, "Polymers for Gas Separations: The Next Decade", Journal of Membrane Science, 1994, pp. 1-65, vol. 94.
"Plastics-Film and Sheeting-Determination of Gas-Transmission Rate—Part 1: Differential—Pressure Method", Japanese Industrial Standard JIS, K 7126-1: 2006, pp. 1166-1173.
Co-pending U.S. Appl. No. 13/868,652, filed Apr. 23, 2013.
Co-pending U.S. Appl. No. 13/868,784, filed Apr. 23, 2013.
Co-pending U.S. Appl. No. 13/868,793, filed Apr. 23, 2013.

* cited by examiner

GAS SEPARATION MEMBRANE

BACKGROUND OF THE INVENTION

The present invention relates to a gas separation membrane.

From long ago, the separation of gas using a gas separation membrane has attracted attention as being a simple and facilitative technique capable of separating a mixture gas continuously while maintaining a gaseous state, the technique not involving a phase change. The separation of gas is a technique for selectively separating a gas with the aid of the presence or absence of permeation and the differences in permeation rate according to the kind of gas (hereinafter, sometimes referred to as gas) which is to permeate through a gas separation membrane.

As materials for the gas separation membrane, there have been known some polymers such as cellulose acetate, polysulfone, polyimide and the like. Of these, polyimide is known as a material having a strength suitable for being used for a gas separation membrane, resistant to breakage, and excellent in heat resistance so as to be usable at high temperatures.

Gas separation membranes using polyimide have variously been reported, in which the influence of the structure of a monomer on gas separation performances such as the permeability of the membrane for separating a target gas, the high selectivity about the target gas and the like is eagerly studied.

For example, it is known that a polyimide-based gas separation membrane containing a hexafluoroisoproylidene group (hereinafter, sometimes referred to as "a —$C(CF_3)_2$— group") in a repeating structure have high permeability of helium (hereinafter, sometimes referred to as "He") and carbon dioxide (hereinafter, sometimes described as "$CO_2$") and therefore the selectivity of these gases about oxygen (hereinafter, sometimes described as "$O_2$") and methane (hereinafter, sometimes referred to as "$CH_4$") is highly exhibited.

Additionally, in producing a gas separation membrane by introducing a —$C(CF_3)_2$— group into a repeating unit of polyimide, it is said possible to weaken the intermolecular interaction while enhancing the rigidity of the chains to cause a difference in permeability of a gas separation membrane according to the kind of gas thereby accomplishing both a high membrane permeability and a high selectivity (see Non-Patent Publications 1 and 2).

However, among materials for synthesizing a —$C(CF_3)_2$— group-containing polyimide, all that is easily usable is the following diamine and tetracarboxylic dianhydride. These are limited in chemical structure when developed into a polyimide membrane, so that it is difficult to design a chemical structure with consideration paid to the strength and separation performance as observed in use as a gas separation membrane.

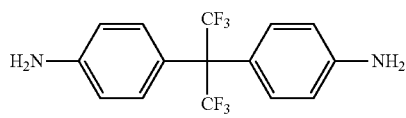

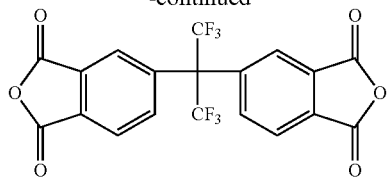

Furthermore, organic solvents into which polyimide is soluble are limited, which also serves as a problem.

In Patent Publications 1 to 3, a fluorine-containing polymerizable monomer for polymerizing a fluorine-containing polyimide, which is a diamine having 2-hydroxy-1,1,1,3,3,3-fluoroisopropyl group (hereinafter, sometimes referred to as "a —$C(CF_3)_2OH$ group" or "a HFIP group") is disclosed together with a method for producing the same.

As a method for producing a gas separation membrane obtained from polyimide and the like, there are: a method of obtaining a uniform membrane by applying a polyimide solution in a wet condition and then only by evaporating a solvent; and a method of obtaining a nonuniform asymmetric membrane formed having a dense layer and a porous layer.

The method of obtaining an asymmetric membrane is exemplified by a method of discharging a polymer solution through an outlet and evaporating a solvent disposed in the vicinity of a surface in air to form a dense layer, in which method the surface is thereafter immersed in a coagulation bath charged with a coagulation liquid (which is a solvent compatible with the solvent for the polymer solution but not compatible with the polymer) thereby forming a finely porous layer in the coagulation bath. In Patent Publication 4, a method for producing a multilayer reverse osmosis membrane according to the above method is disclosed.

As discussed above, diamine and tetracarboxylic dianhydride for obtaining a (—$C(CF_3)_2$—) group-containing polyimide are limited in chemical structure when developed into a polyimide membrane, as discussed above, so that it is difficult to design a chemical structure with consideration paid to the formability, strength and separation performance of a gas separation membrane.

REFERENCES ABOUT PRIOR ART

Patent Publication

Patent Publication 1: Japanese Patent Application Publication No. 2007-119503
Patent Publication 2: Japanese Patent Application Publication No. 2007-119504
Patent Publication 3: Japanese Patent Application Publication No. 2008-150534
Patent Publication 4: U.S. Pat. No. 3,133,132

Non-Patent Publication

Non-Patent Publication 1: Kenichi OKAMOTO et al., Polymer Application, Vol. 41, No. 1, pp. 16, 1992
Non-Patent Publication 2: S. A. Stern, Journal of Membrane Science, Vol. 94, pp. 1, 1994

SUMMARY OF THE INVENTION

Problems to be Solved by the Invention

An object of the present invention is to provide a gas separation membrane which can overcome the above-mentioned drawbacks, soluble in an organic solvent, readily formable and excellent in gas separation performance when used as a gas separation membrane.

Means for Solving the Problems

The present inventors found that a polyimide having a HFIP group (a polar group including —OH group) as a substituent and obtained from an aromatic diamine where two —NH$_2$ groups of this compound are asymmetrically substituted can be provided with a solubility in an organic solvent, particularly in a polar solvent and can be improved in gas separation performance when formed into a gas separation membrane, thereby completing the present invention.

More specifically, the present invention is as follows.

[Invention 1]

A gas separation membrane, comprising:
a polyimide structure that contains a repeating unit represented by general formula (1):

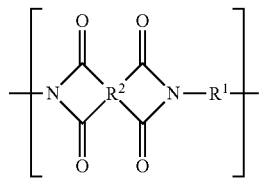

(1)

(In the formula, R$^1$ is a divalent organic group and R$^2$ is a tetravalent organic group.),
wherein R$^1$ is a divalent organic group represented by general formula (2):

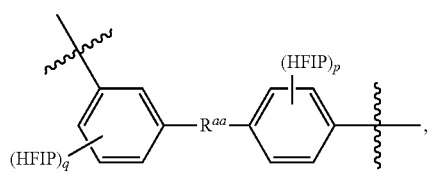

(2)

(In the formula, R$^{aa}$ is a single bond, an oxygen atom, a sulfur atom, —SO$_2$— group, —CH$_2$— group, —C(=O)— group, —C(CH$_3$)$_2$— group, —C(CH$_3$)(CH$_2$CH$_3$)— group, —C(CF$_3$)$_2$— group, —CH(CH$_3$)— group, —CH(OH)— group, —NH— group or a divalent organic group formed by removing any two hydrogen atoms from a C$_3$-C$_{12}$ alicyclic hydrocarbon or C$_6$-C$_{25}$ aromatic hydrocarbon. HFIP represents a —C(CF$_3$)$_2$OH group. "p" and "q" mutually independently represent an integer of 0 to 2 such that 1≤p+q≤4. A straight line that intersects with a wiggly line represents a bonding moiety.) or a divalent organic group represented by general formula (3):

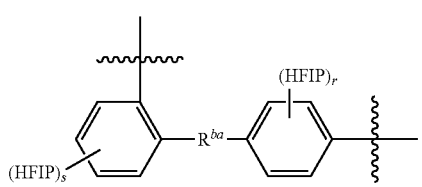

(3)

(In the formula, R$^{ba}$ is a single bond, an oxygen atom, a sulfur atom, —SO$_2$— group, —CH$_2$— group, —C(=O)— group, —C(CH$_3$)$_2$— group, —C(CH$_3$)(CH$_2$CH$_3$)— group, —C(CF$_3$)$_2$— group, —CH(CH$_3$)— group, —CH(OH)— group, —NH— group or a divalent organic group formed by removing any two hydrogen atoms from a C$_3$-C$_{12}$ alicyclic hydrocarbon or C$_6$-C$_{25}$ aromatic hydrocarbon. HFIP represents a —C(CF$_3$)$_2$OH group. "r" and "s" mutually independently represent an integer of 0 to 2 such that 1≤r+s≤4. A straight line that intersects with a wiggly line represents a bonding moiety.).

[Invention 2]

A gas separation membrane as discussed in Invention 1, wherein the divalent organic group represented by general formula (2) is a divalent organic group represented by general formula (4):

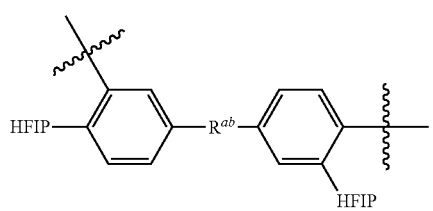

(4)

(In the formula, R$^{ab}$ is a single bond, an oxygen atom, a sulfur atom, —SO$_2$— group, —CH$_2$— group, —C(=O)— group, —C(CH$_3$)$_2$— group, —C(CH$_3$)(CH$_2$CH$_3$)— group, —C(CF$_3$)$_2$— group, —CH(CH$_3$)— group, —CH(OH)— group, —NH— group or a divalent organic group formed by removing any two hydrogen atoms from a C$_3$-C$_{12}$ alicyclic hydrocarbon or C$_6$-C$_{25}$ aromatic hydrocarbon. HFIP represents a —C(CF$_3$)$_2$OH group. A straight line that intersects with a wiggly line represents a bonding moiety.).

[Invention 3]

A gas separation membrane as discussed in Invention 1 or 2, wherein the divalent organic group represented by general formula (2) is any one of divalent organic groups represented by formulas (4-1) and (4-2):

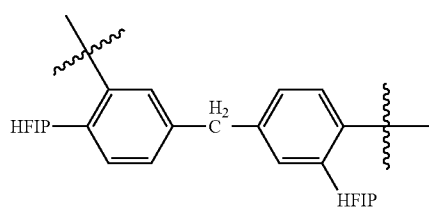

(4-1)

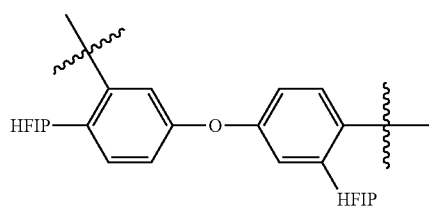

(4-2)

(In the formula, HFIP represents a —C(CF$_3$)$_2$OH group. A straight line that intersects with a wiggly line represents a bonding moiety.).

[Invention 4]

A gas separation membrane as discussed in Invention 1, wherein the divalent organic group represented by general formula (3) is any one of divalent organic groups represented by formula (5):

(5)

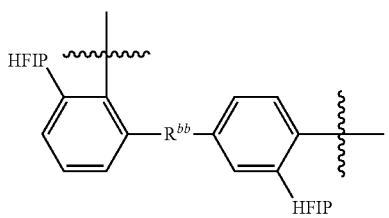

(In the formula, $R^{bb}$ is a single bond, an oxygen atom, a sulfur atom, —SO$_2$— group, —CH$_2$— group, —C(=O)— group, —C(CH$_3$)$_2$— group, —C(CH$_3$)(CH$_2$CH$_3$)— group, —C(CF$_3$)$_2$— group, —CH(CH$_3$)— group, —CH(OH)— group, —NH— group or a divalent organic group formed by removing any two hydrogen atoms from a $C_3$-$C_{12}$ alicyclic hydrocarbon or $C_6$-$C_{25}$ aromatic hydrocarbon. HFIP represents a —C(CF$_3$)$_2$OH group. A straight line that intersects with a wiggly line represents a bonding moiety.).

[Invention 5]

A gas separation membrane as discussed in Invention 1 or 4, wherein the divalent organic group represented by general formula (3) is any one of divalent organic groups represented by formulas (5-1) and (5-2):

(5-1)

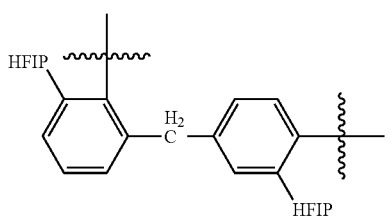

(5-2)

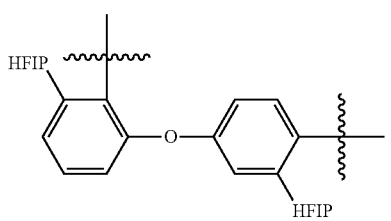

(In the formula, HFIP represents a —C(CF$_3$)$_2$OH group. A straight line that intersects with a wiggly line represents a bonding moiety.).

[Invention 6]

A gas separation membrane as discussed in any one of Inventions 1 to 5, wherein $R^2$ is any one of tetravalent organic groups represented by formulas (6) to (11):

(6)

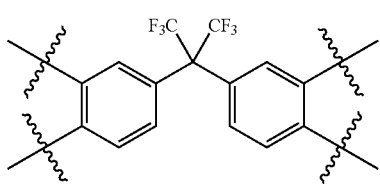

(7)

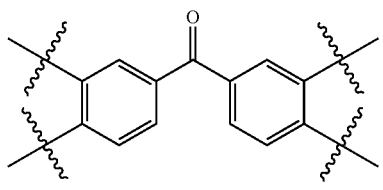

(8)

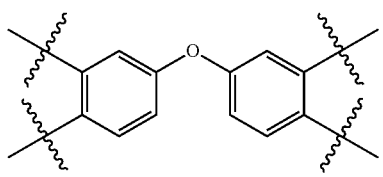

(9)

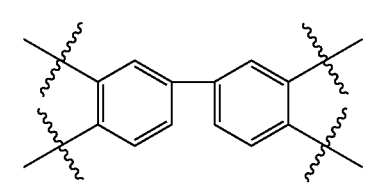

(10)

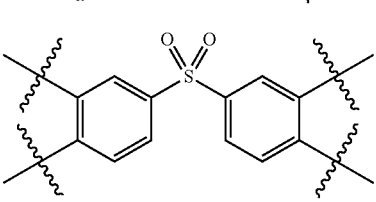

(11)

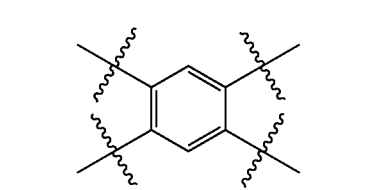

(In the formula, a straight line that intersects with a wiggly line represents a bonding moiety.).

[Invention 7]

A gas separation membrane as discussed in any one of Inventions 1 to 6, wherein a hydrogen atom of —OH group that a HFIP group contained in $R^1$ has is substituted with a glycidyl group.

[Invention 8]

A gas separation membrane as discussed in Invention 7, wherein the glycidyl group forms crosslinking in a manner that its cyclic ether moiety is opened.

[Invention 9]

A gas separation membrane as discussed in any one of Inventions 1 to 8, obtained by being mixed with an epoxy compound and then heated.

[Invention 10]

A gas separation membrane as discussed in Invention 9, wherein the epoxy compound is represented by general formula (12):

(12)

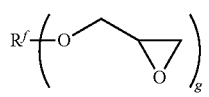

(In the formula, $R^f$ is an organic group having a valence of "g" and formed by removing any "g" hydrogen atoms from an alkane or an aromatic or alicyclic ring, and may contain an oxygen atom, sulfur atom or nitrogen atom in its structure, wherein a part of hydrogen atoms may be substituted with fluorine atom, chlorine atom, alkyl group or fluoroalkyl group. "g" is an integer of 1 to 4.).

[Invention 11]

A polyimide comprising:

a repeating unit represented by general formula (1):

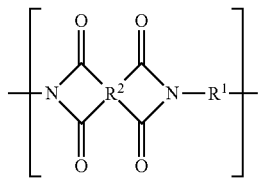

(1)

(In the formula, $R^1$ is a divalent organic group and $R^2$ is a tetravalent organic group.), wherein $R^1$ is a divalent organic group represented by general formula (2):

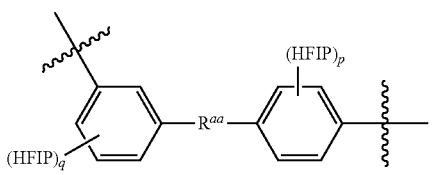

(2)

(In the formula, $R^{aa}$ is a single bond, an oxygen atom, a sulfur atom, —$SO_2$— group, —$CH_2$— group, —C(=O)— group, —$C(CH_3)_2$— group, —$C(CH_3)(CH_2CH_3)$— group, —$C(CF_3)_2$— group, —$CH(CH_3)$— group, —CH(OH)— group, —NH— group or a divalent organic group formed by removing any two hydrogen atoms from a $C_3$-$C_{12}$ alicyclic hydrocarbon or $C_6$-$C_{25}$ aromatic hydrocarbon. HFIP represents a —$C(CF_3)_2OH$ group. "p" and "q" mutually independently represent an integer of 0 to 2 such that $1 \leq p+q \leq 4$. A straight line that intersects with a wiggly line represents a bonding moiety.), or a divalent organic group represented by general formula (3):

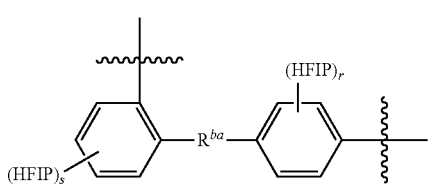

(3)

(In the formula, $R^{ba}$ is a single bond, an oxygen atom, a sulfur atom, —$SO_2$— group, —$CH_2$— group, —C(=O)— group, —$C(CH_3)_2$— group, —$C(CH_3)(CH_2CH_3)$— group, —$C(CF_3)_2$— group, —$CH(CH_3)$— group, —CH(OH)— group, —NH— group or a divalent organic group formed by removing any two hydrogen atoms from a $C_3$-$C_{12}$ alicyclic hydrocarbon or $C_6$-$C_{25}$ aromatic hydrocarbon. HFIP represents a —$C(CF_3)_2OH$ group. "r" and "s" mutually independently represent an integer of 0 to 2 such that $1 \leq r+s \leq 4$. A straight line that intersects with a wiggly line represents a bonding moiety.), wherein a hydrogen atom of —OH group that a HFIP group contained in $R^1$ has is substituted with a glycidyl group.

[Invention 12]

A cured product comprising:

a polyimide having a glycidyl group, as discussed in Invention 11, wherein the glycidyl group forms crosslinking in a manner that its cyclic ether moiety is opened.

[Invention 13]

A cured product comprising:

a polyimide as discussed in Invention 11; and an epoxy compound, wherein the cured product is obtained by mixing the polyimide with the epoxy compound and then by heating it.

[Invention 14]

A cured product as discussed in Invention 13, wherein the epoxy compound is represented by general formula (12):

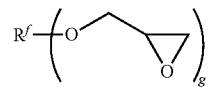

(12)

(In the formula, $R^f$ is an organic group having a valence of "g" and formed by removing any "g" hydrogen atoms from an alkane or an aromatic or alicyclic ring, and may contain an oxygen atom, sulfur atom or nitrogen atom in its structure, wherein a part of hydrogen atoms may be substituted with fluorine atom, chlorine atom, alkyl group or fluoroalkyl group. "g" is an integer of 1 to 4.).

Effects of the Invention

A polyimide-based gas separation membrane of the present invention, obtained from an asymmetric aromatic diamine containing a HFIP group as a substituent exhibits an excellent separation performance derived from possession of a HFIP group as a substituent and from an asymmetric structure. The HFIP group has —OH group, so that the gas separation membrane according to the present invention is soluble in a specified organic solvent, particularly in a polar solvent. Therefore, it is possible to easily prepare a polyimide solution and the gas separation membrane can be formed into a desired shape.

Moreover, in a polyimide-based gas separation membrane of the present invention having a HFIP group and an asymmetric structure, it is easy to introduce a HFIP group into the aromatic diamine having an asymmetric structure and serving as the starting material. With this, it becomes possible to design a structure not only having a high gas separation performance but also superior to conventional fluorine-containing polyimide-based gas separation membrane in membrane properties (e.g. the membrane strength and the swelling resistance in a solvent).

Additionally, a gas separation membrane containing —$C(CF_3)_2$— group in addition to a HFIP group and an asymmetric structure exhibits a further excellent gas separation performance.

DETAILED DESCRIPTION OF THE INVENTION

Hereinafter the present invention will specifically be explained; however, the present invention is not limited by the following embodiments.

In the present specification, polyimide having a HFIP group and having an asymmetric structure may be referred to as "a HFIP group-containing asymmetric polyimide". Additionally, an aromatic diamine compound containing a HFIP group and having an asymmetric structure may be referred to as "a HFIP group-containing asymmetric aromatic diamine compound".

A gas separation membrane of the present invention is produced from a HFIP group-containing asymmetric polyimide. A monomer that serves as the starting material for the HFIP group-containing asymmetric polyimide is exemplified by a HFIP group-containing asymmetric aromatic diamine and a tetracarboxylic dianhydride. In order to ensure the strength of the gas separation membrane, it is preferable to adopt an aromatic diamine. These monomers are reacted with each other thereby forming the HFIP group-containing asymmetric polyimide.

In addition to an asymmetric aromatic diamine containing a HFIP group, it is also possible to add another diamine in order to adjust the strength and the separation performance of the membrane. Likely, for the purpose of adjusting the strength and the separation performance of the membrane, it is also possible to add another dicarboxylic acid or derivative thereof in addition to tetracarboxylic dianhydride.

1. HFIP Group-containing Asymmetric Aromatic Diamine

A HFIP group-containing asymmetric aromatic diamine, which serves as a monomer for synthesizing a HFIP group-containing asymmetric polyimide for producing a gas separation membrane of the present invention, is represented by formula (2-A):

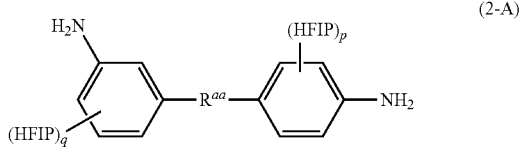

(2-A)

(In the formula, $R^{aa}$ is a single bond, an oxygen atom, a sulfur atom, —SO$_2$— group, —CH$_2$— group, —C(=O)— group, —C(CH$_3$)$_2$— group, —C(CH$_3$)(CH$_2$CH$_3$)— group, —C(CF$_3$)$_2$— group, —CH(CH$_3$)— group, —CH(OH)— group, —NH— group or a divalent organic group formed by removing any two hydrogen atoms from a C$_3$-C$_{12}$ alicyclic hydrocarbon or C$_6$-C$_{25}$ aromatic hydrocarbon. HFIP represents a —C(CF$_3$)$_2$OH group. "p" and "q" mutually independently represent an integer of 0 to 2 such that 1≤p+q≤4.) or formula (3-A):

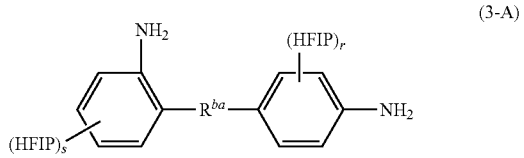

(3-A)

(In the formula, is a single bond, an oxygen atom, a sulfur atom, —SO$_2$— group, —CH$_2$— group, —C(=O)— group, —C(CH$_3$)$_2$— group, —C(CH$_3$)(CH$_2$CH$_3$)— group, —C(CF$_3$)$_2$— group, —CH(CH$_3$)— group, —CH(OH)— group, —NH— group or a divalent organic group formed by removing any two hydrogen atoms from a C$_3$-C$_{12}$ alicyclic hydrocarbon or C$_6$-C$_{25}$ aromatic hydrocarbon. HFIP represents a —C(CF$_3$)$_2$OH group. "r" and "s" mutually independently represent an integer of 0 to 2 such that 1≤r+s≤4.).

[HFIP Group-containing Asymmetric Aromatic Diamine (2-A)]

In a HFIP group-containing asymmetric aromatic diamine (2-A), a divalent organic group formed by removing two hydrogen atoms from a C$_3$-C$_{12}$ alicyclic hydrocarbon is preferably exemplified by a divalent organic group formed by removing two hydrogen atoms from cyclohexane, bicyclohexane, adamantine or norbornane. A divalent organic group formed by removing two hydrogen atoms from a C$_6$-C$_{25}$ aromatic hydrocarbon is exemplified by a divalent organic group foamed by removing two hydrogen atoms from benzene, biphenyl, naphthalene or fluorene.

A HFIP group-containing asymmetric aromatic diamine (2-A) is preferably a compound represented by formula (4-A):

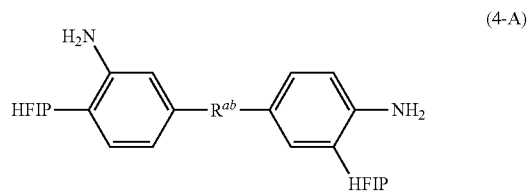

(4-A)

(In the formula, $R^{ab}$ is a single bond, an oxygen atom, a sulfur atom, —SO$_2$— group, —CH$_2$— group, —C(=O)— group, —C(CH$_3$)$_2$— group, —C(CH$_3$)(CH$_2$CH$_3$)— group, —C(CF$_3$)$_2$— group, —CH(CH$_3$)— group, —CH(OH)— group, —NH— group or a divalent organic group formed by removing any two hydrogen atoms from a C$_3$-C$_{12}$ alicyclic hydrocarbon or C$_6$-C$_{25}$ aromatic hydrocarbon. HFIP represents a —C(CF$_3$)$_2$OH group.). Such a compound is concretely exemplified by compounds of formulas (4-1-A) to (4-14-A):

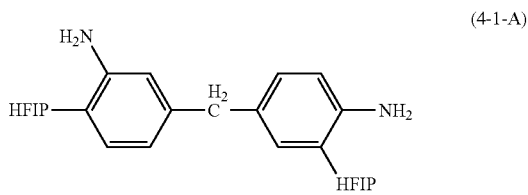

(4-1-A)

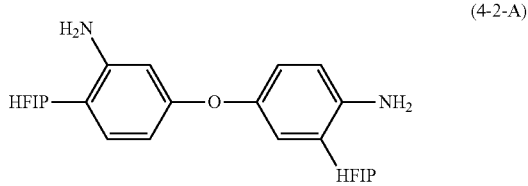

(4-2-A)

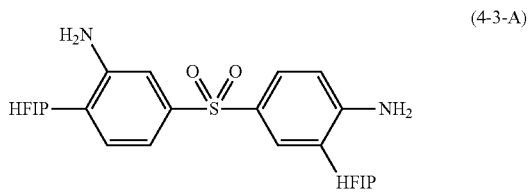

(4-3-A)

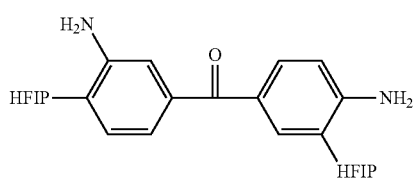 (4-4-A)

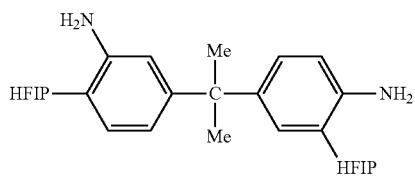 (4-5-A)

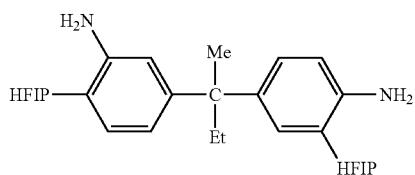 (4-6-A)

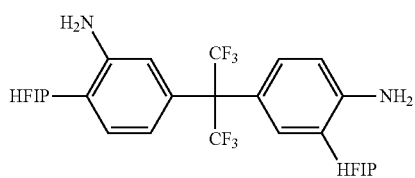 (4-7-A)

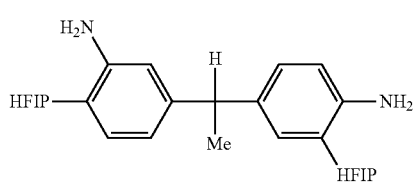 (4-8-A)

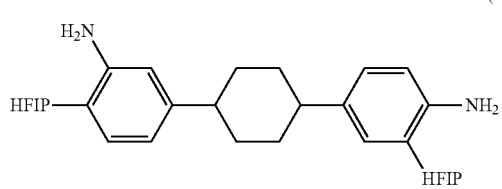 (4-9-A)

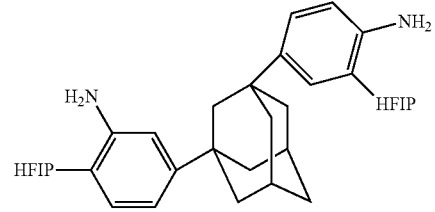 (4-10-A)

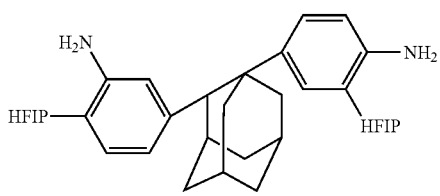 (4-11-A)

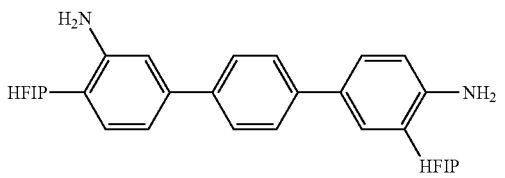 (4-12-A)

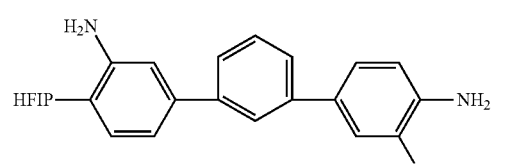 (4-13-A)

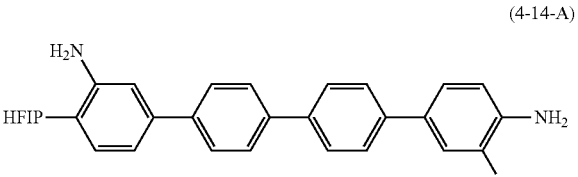 (4-14-A)

(In the formulas, HFIP represents a —C(CF$_3$)$_2$OH group. "Me" represents a methyl group. "Et" represents an ethyl group.). Of these, a compound represented by formula (4-1-A) or (4-2-A) is particularly preferable in view of the availability of the starting material diamine.

[HFIP Group-containing Asymmetric Aromatic Diamine (3-A)]

In a HFIP group-containing asymmetric aromatic diamine (3-A), a divalent organic group formed by removing two hydrogen atoms from a C$_3$-C$_{12}$ alicyclic hydrocarbon is preferably exemplified by a divalent organic group formed by removing two hydrogen atoms from cyclohexane, bicyclohexane, adamantine or norbornane. A divalent organic group formed by removing two hydrogen atoms from a C$_6$-C$_{25}$ aromatic hydrocarbon is exemplified by a divalent organic group formed by removing two hydrogen atoms from benzene, biphenyl, naphthalene or fluorene.

A HFIP group-containing asymmetric aromatic diamine (3-A) is preferably a compound represented by formula (5-A):

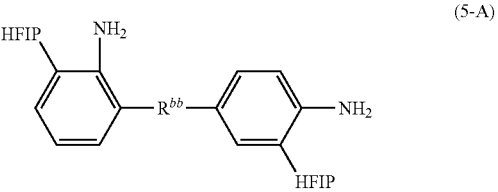 (5-A)

(In the formula, R$^{bb}$ is a single bond, an oxygen atom, a sulfur atom, —SO$_2$— group, —CH$_2$— group, —C(=O)— group, —C(CH$_3$)$_2$— group, —C(CH$_3$)(CH$_2$CH$_3$)— group, —C(CF$_3$)$_2$— group, —CH(CH$_3$)— group, —CH(OH)— group, —NH— group or a divalent organic group formed by removing any two hydrogen atoms from a C$_3$-C$_{12}$ alicyclic hydrocarbon or C$_6$-C$_{25}$ aromatic hydrocarbon. HFIP represents a —C(CF$_3$)$_2$OH group.). Such a compound is concretely exemplified by compounds of formulas (5-1-A) to (5-14-A):

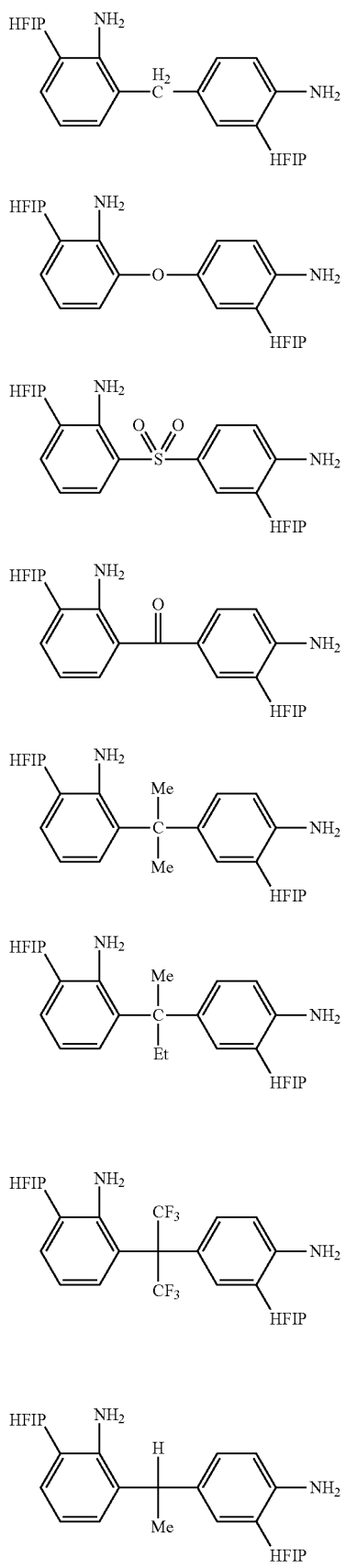
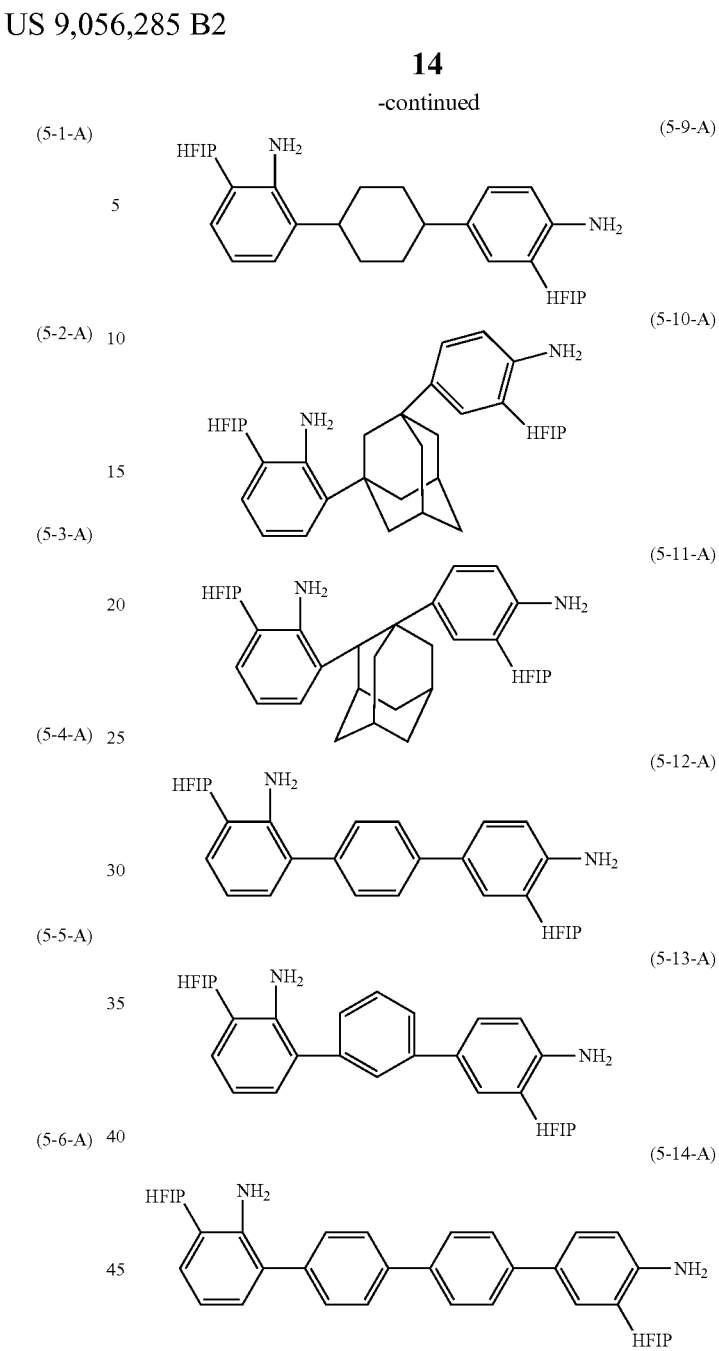

(In the formulas, HFIP represents a —C(CF$_3$)$_2$OH group. "Me" represents a methyl group. "Et" represents an ethyl group.). Of these, a compound represented by formula (5-1-A) or (5-2-A) is particularly preferable in view of the availability of the starting material diamine.

These HFIP group-containing asymmetric aromatic diamines may be used in combination of two or more kinds.

These diamines are obtained through a reaction between an asymmetric structure-having aromatic diamine and hexafluoroacetone or hexafluoroacetone trihydrate. As a method for producing the same, it is possible to apply a method discussed in Patent Publication 1 where a symmetric structure-having aromatic diamine and hexafluoroacetone or hexafluoroacetone trihydrate is reacted.

2. Another Diamine

For the purpose of adjusting membrane properties such as gas separation performance, solubility in a polar solvent and membrane strength of the gas separation membrane, it is possible, at the time of synthesizing polyimide containing a HFIP group and an asymmetric structure, to use another diamine or dihydroxyamine in addition to an asymmetric aromatic diamine containing a HFIP group. The amount to be used is 10 to 80 mol %, preferably 30 to 60 mol % relative to the tetracarboxylic dianhydride.

Diamine is exemplified by 3,5-diaminobenzotrifluoride, 2,5-diaminobenzotrifluoride, 3,3'-bistrifluoromethyl-4,4'-diaminobiphenyl, 3,3'-bistrifluoromethyl-5,5'-diaminobiphenyl, bis(trifluoromethyl)-4,4'-diaminodiphenyl, bis(fluoroalkyl)-4,4'-diaminodiphenyl, dichloro-4,4'-diaminodiphenyl, dibromo-4,4'-diaminodiphenyl, bis(fluoroalkoxy)-4,4'-diaminodiphenyl, diphenyl-4,4'-diaminodiphenyl, 4,4'-bis(4-aminotetrafluorophenoxy)tetrafluorobenzene, 4,4'-bis(4-aminotetrafluorophenoxy)octafluorobiphenyl, 4,4'-binaphthylamine, o-phenylenediamine, m-phenylenediamine, p-phenylenediamine, 2,4-diaminotoluene, 2,5-diaminotoluene, 2,4-diaminoxylene, 2,4-diaminodurene, 1,4-xylylenediamine, dimethyl-4,4'-diaminodiphenyl, dialkyl-4,4'-diaminodiphenyl, dimethyl-diaminodiphenylmethane, 9,9-bis(4-aminophenyl)fluorene, 4,4'-diaminodiphenylether, 3,4'-diaminodiphenylether, 4,4'-diaminodiphenylsulfide, 3,4'-diaminodiphenylsulfide, 4,4'-diaminodiphenylsulfone, 3,3'-diaminodiphenylsulfone, 4,4'-diaminobenzophenone, 3,3'-diaminobenzophenone, 1,3-bis(3-aminophenoxy)benzene, 1,3-bis(4-aminophenoxy)benzene, 1,4-bis(4-aminophenoxy)benzene, 4,4'-bis(4-aminophenoxy)biphenyl, bis(4-(3-aminophenoxy)phenyl)sulfone, bis(4-(4-aminophenoxy)phenyl)sulfone, 2,2-bis(4-(4-aminophenoxy)phenyl)propane, 2,2-bis(4-(4-aminophenoxy)phenyl)hexafluoropropane, 2,2-bis(4-(3-aminophenoxy)phenyl)propane, 2,2-bis(4-(3-aminophenoxy)phenyl)hexafluoropropane, 2,2-bis(4-(4-amino-2-trifluoromethylphenoxy)phenyl)hexafluoropropane, 2,2-bis(4-(3-amino-5-trifluoromethylphenoxy)phenyl)hexafluoropropane, 2,2-bis(4-aminophenyl)hexafluoropropane, 2,2-bis(3-aminophenyl)hexafluoropropane, 2,2-bis(3-amino-4-hydroxyphenyl)hexafluoropropane, 2,2-bis(3-amino-4-methylphenyl)hexafluoropropane, 4,4'-bis(4-aminophenoxy)octafluorobiphenyl or 4,4'-diaminobenzanilide. These may be used in combination of two or more kinds. Among these, it is preferable to use a diamine providing an obtained gas separation membrane with high permeability and containing —C(CF$_3$)$_2$— group, the diamine being represented by the following structural formula:

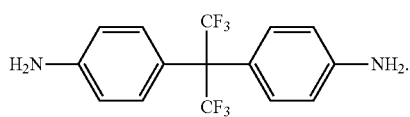

Furthermore, examples of dihydroxyamine are 3,3'-dihydroxybenzidine, 3,3'-diamino-4,4'-dihydroxybiphenyl, 4,4'-diamino-3,3'-dihydroxybiphenyl, 3,3'-diamino-4,4'-dihydroxydiphenylsulfone, 4,4'-diamino-3,3'-dihydroxydiphenylsulfone, bis(3-amino-4-hydroxyphenyl)methane, 2,2-bis(3-amino-4-hydroxyphenyl)propane, 2,2-bis(3-amino-4-hydroxyphenyl)hexafluoropropane, 2,2-bis(4-amino-3-hydroxyphenyl)hexafluoropropane, bis(4-amino-3-hydroxyphenyl)methane, 2,2-bis(4-amino-3-hydroxyphenyl)propane, 4,4'-diamino-3,3'-dihydroxybenzophenone, 3,3'-diamino-4,4'-dihydroxybenzophenone, 4,4'-diamino-3,3'-dihydroxydiphenylether, 3,3'-diamino-4,4'-dihydroxydiphenylether, 1,4-diamino-2,5-dihydroxybenzene, 1,3-diamino-2,4-dihydroxybenzene, and 1,3-diamino-4,6-dihydroxybenzene. These may be used in combination of two or more kinds. Among these, it is preferable to use a dihydroxyamine providing an obtained gas separation membrane with high permeability and containing —C(CF$_3$)$_2$— group, the dihydroxyamine being represented by the following structural formula.

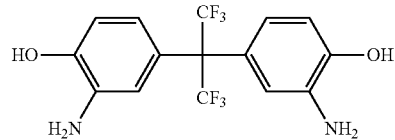

3. Tetracarboxylic Dianhydride

Tetracarboxylic dianhydride, which is used to synthesize a HFIP group-containing asymmetric polyimide of the present invention, is represented by general formula (12):

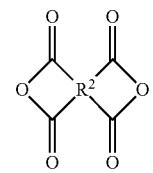

(In the formula, R$^2$ represents a tetravalent organic group.)

In the general formula (12), R$^2$ is preferably a tetravalent organic group formed by removing four hydrogen atoms from an alkane or an alicyclic or aromatic ring, and may contain a fluorine atom, chlorine atom, oxygen atom, sulfur atom or nitrogen atom in its structure, wherein a part of hydrogen atoms may be substituted with an alkyl group, fluoroalkyl group, carboxyl group, hydroxyl group or cyano group.

As the above-mentioned tetracarboxylic dianhydride, it is possible to concretely cite pyromellitic dianhydride (hereinafter, sometimes referred to as "PMDA"), trifluoromethyl-benzenetetracarboxylic dianhydride, bistrifluoromethylbenzenetetracarboxylic dianhydride, difluorobenzenetetracarboxylic dianhydride, naphthalenetetracarboxylic dianhydride, biphenyltetracarboxylic dianhydride (hereinafter, sometimes referred to as "BPDA"), terphenyltetracarboxylic dianhydride, 3,3',4,4'-benzophenonetetracarboxylic dianhydride (hereinafter, sometimes referred to as "BTDA"), oxydiphthalic dianhydride (hereinafter, sometimes referred to as "ODPA"), bicycle[2,2,2]oct-7-ene-2,3,5,6-tetracarboxylic dianhydride, 2,2-bis(3,4-dicarboxyphenyl)hexafluoropropionic dianhydride (hereinafter, sometimes referred to as "6FDA"), 2,3,4,5-thiophenetetracarboxylic dianhydride, 2,5,6,2',5',6'-hexafluoro-3,3',4,4'-biphenyltetracarboxylic dianhydride, bis(3,4-dicarboxyphenyl)sulfonic dianhydride (hereinafter, sometimes referred to as "DSDA") and 3,4,9,10-perylenetetracarboxylic dianhydride. These tetracarboxylic dianhydride may be used in combination of two or more kinds, and there is no particular limitation in the case of combined use.

Of these, PMDA, BPDA, BTDA, DSDA, ODPA and 6FDA are particularly preferable in view of availability, and more specifically, 6FDA is further preferable because of having excellent gas separation performances (permeability and selectivity).

4. Dicarboxylic Acid and Dicarboxylic Acid Derivative

In order to adjust membrane properties for a gas separation membrane, such as separation performance, strength and the like, it is also possible to use a dicarboxylic acid or dicarboxylic acid derivative represented by general formula (13) or (14):

(13)

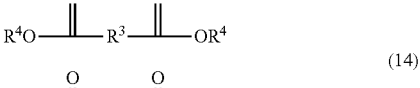

(14)

(In the formulas, $R^3$ is a divalent organic group that contains one of more kinds selected from an alicyclic group, aromatic ring and alkylene group and may contain an oxygen atom, sulfur atom or nitrogen atom, wherein an arbitrary number of hydrogen atoms may be substituted with alkyl group, fluorine atom, chlorine atom, fluoroalkyl group, carboxyl group, hydroxyl group or cyano group. $R^4$ mutually independently represents a hydrogen atom, $C_1$-$C_{10}$ alkyl group or benzyl group. "X" mutually independently represents a chlorine atom, fluorine atom, bromine atom or iodo atom.) in addition to the above-mentioned tetracarboxylic dianhydride.

After condensation reaction, there is provided a structural unit containing a heterocyclic structure represented by general formula (15) as a copolymerized component.

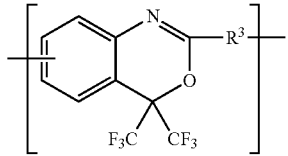

(15)

(In the formulas, $R^3$ is a divalent organic group that contains one of more kinds selected from an alicyclic group, aromatic ring and alkylene group and may contain an oxygen atom, sulfur atom or nitrogen atom, wherein an arbitrary number of hydrogen atoms may be substituted with alkyl group, fluorine atom, chlorine atom, fluoroalkyl group, carboxyl group, hydroxyl group or cyano group.)

As a dicarboxylic acid or dicarboxylic acid derivative represented by general formula (13) or (14), it is possible to use any of an aliphatic dicarboxylic acid, an aromatic dicarboxylic acid and a dicarboxylic acid derivative of these.

Aliphatic dicarboxylic acid and a derivative thereof are exemplified by dicarboxylic compounds such as oxalic acid, malonic acid, succinic acid, glutaric acid, adipic acid, pimelic acid, suberic acid, azelaic acid and sebacic acid and derivatives of these.

Aromatic dicarboxylic acid and a derivative thereof are exemplified by phthalic acid, isophthalic acid, terephthalic acid, 4,4'-dicarboxybiphenyl, 3,3'-dicarboxybiphenyl, 3,3'-dicarboxydiphenyl ether, 3,4'-dicarboxydiphenyl ether, 4,4'-dicarboxydiphenyl ether, 3,3'-dicarboxydiphenylmethane, 3,4'-dicarboxydiphenylmethane, 4,4'-dicarboxydiphenylmethane, 3,3'-dicarboxydiphenyldifluoromethane, 3,4'-dicarboxydiphenyldifluoromethane, 4,4'-dicarboxydiphenyldifluoromethane, 3,3'-dicarboxydiphenylsulfone, 3,4'-dicarboxydiphenylsulfone, 4,4'-dicarboxydiphenylsulfone, 3,3'-dicarboxydiphenylsulfide, 3,4'-dicarboxydiphenylsulfide, 4,4'-dicarboxydiphenylsulfide, 3,3'-dicarboxydiphenylketone, 3,4'-dicarboxydiphenylketone, 4,4'-dicarboxydiphenylketone, 2,2-bis(3-carboxyphenyl)propane, 2,2-bis (3,4'-dicarboxyphenyl)propane, 2,2-bis(4-carboxyphenyl) propane, 2,2-bis(3-carboxyphenyl)hexafluoropropane, 2,2-bis(3,4'-dicarboxyphenyl)hexafluoropropane, 2,2-bis(4-carboxyphenyl)hexafluoropropane, 2,2'-ditrifluoromethyl-4, 4'-dicarboxybiphenyl, 1,3-bis(3-carboxyphenoxy)benzene, 1,4-bis(3-carboxyphenoxy)benzene, 1,4-bis(4-carboxyphenoxy)benzene, 3,3'-(1,4-phenylenebis(1-methylethylidene)) bisbenzoic acid, 3,4'-(1,4-phenylenebis(1-methylethylidene))bisbenzoic acid, 4,4'-(1,4-phenylenebis(1-methylethylidene))bisbenzoic acid, 2,2-bis(4-(3-carboxyphenoxy)phenyl)propane, 2,2-bis(4-(4-carboxyphenoxy)phenyl)propane, 2,2-bis(4-(3-carboxyphenoxy)phenyl)hexafluoropropane, 2,2-bis(4-(4-carboxyphenoxy)phenyl)hexafluoropropane, bis(4-(3-carboxyphenoxy)phenyl)sulfide, bis(4-(4-carboxyphenoxy) phenyl)sulfide, bis(4-(3-carboxyphenoxy)phenyl)sulfone and bis(4-(4-carboxyphenoxy)phenyl)sulfone, perfluorononenyloxy group-containing ones such as 5-(perfluorononenyloxy)isophthalic acid and 4-(perfluorononenyloxy) phthalic acid, and derivatives of these dicarboxylic acids. Furthermore, it is also possible to cite 2-(perfluorononenyloxy)terephthalic acid, 4-methoxy-5-(perfluorononenyloxy) isophthalic acid and derivatives of these dicarboxylic acids. Additionally, it is also possible to cite perfluorohexenyloxy group-containing dicarboxylic acids such as 5-(perfluorohexenyloxy)isophthalic acid, 4-(perfluorohexenyloxy)phthalic acid, 2-(perfluorohexenyloxy)terephthalic acid, 4-methoxy-5-(perfluorohexenyloxy)isophthalic acid and derivatives of these. These may be used in combination of two or more kinds.

Among these, terephthalic acid, isophthalic acid, 4,4'-dicarboxybiphenyl, 2,2'-ditrifluoromethyl-4,4'-dicarboxybiphenyl and 2,2-bis(4-carboxyphenyl)hexafluoropropane are preferable because of its availability, ease of polycondensation and good transparency of polymer.

The amount of the dicarboxylic acid or dicarboxylic acid derivative to be used is not less than 10 mol % and not more than 80 mol %, preferably not less than 30 mol % and not more than 60 mol % relative to the tetracarboxylic dianhydride. Within this mole ratio range, adjustments of the gas separation performance, the solubility in a polar solvent and the membrane strength are allowed.

5. Synthesis of HFIP Group-containing Asymmetric Polyimide

A method of synthesizing a HFIP group-containing asymmetric polyimide used for a gas separation membrane of the present invention will be discussed.

Hereinafter, an expression of "a dicarboxylic acid (derivative)" means "a dicarboxylic acid or dicarboxylic acid derivative". The same applies to the following in this specification.

As a method for synthesizing a HFIP group-containing asymmetric polyimide used for a gas separation membrane of the present invention, it is possible to cite methods absolutely requiring the above-mentioned HFIP group-containing asymmetric aromatic diamine and the tetracarboxylic dianhydride, in which methods another diamine and a dicarboxylic acid (derivative) may be added as needed and then these are dissolved in each other at 150° C. or more with no solvent to be reacted or these are brought into polymerization reaction at a reaction temperature of −20 to 80° C. in the presence of an organic solvent. In polymerization reaction, diamine and carboxylic dianhydride or dicarboxylic acid (derivative) is reacted at a mole ratio of 1:1, so that it is preferable that the abundance ratio of a HFIP group-containing asymmetric aromatic diamine and another diamine to tetracarboxylic dianhydride and dicarboxylic acid (derivative) falls at a mole ratio (aromatic diamine and another diamine:tetracarboxylic dianhydride and dicarboxylic acid (derivative)) of 1:1.

An organic solvent usable in the above-mentioned polymerization reaction is required only to be one that can dissolve the substrate and exemplified by: amide-based solvents such as N,N-dimethylformamide, N,N-dimethylacetamide, hexamethylphosphoric triamide and N-methyl-2-pyrrolidone; aromatic solvents such as benzene, anisole, diphenyl ether, nitrobenzene and benzonitrile; halogen-based solvents such as chloroform, dichloromethane, 1,2-dichloroethane and 1,1,2,2-tetrachloroethane; and lactones such as γ-butyrolactone, γ-valerolactone, δ-valerolactone, γ-caprolactone, ε-caprolactone and α-methyl-γ-butyrolactone. These organic solvents may coexist with an acid acceptor (e.g., pyridine and triethylamine) to cause polymerization reaction.

A polyamic acid containing a HFIP group and an asymmetric structure, obtained through the above-mentioned polymerization reaction is brought into a dehydration cyclization reaction to form imide thereby achieving the conversion into the target compound (i.e., polyimide containing a HFIP group and an asymmetric structure).

The dehydration cyclization reaction is conducted under such a reaction condition (including a heating condition, use of an acid catalyst and the like) as to accelerate the cyclization. In general, a solution of polyamic acid containing a HFIP group and an asymmetric structure, obtained immediately after polymerization reaction, is imidized at a high temperature of not lower than 150° C. and not higher than 250° C. thereby allowing a preparation of a solution of a HFIP group-containing asymmetric polyimide. At this time, pyridine, triethylamine, acetic anhydride or the like may be added thereto. The concentration of the HFIP group-containing asymmetric polyimide in the solution is preferably not smaller than 5 mass % and not larger than 50 mass %. When the concentration is smaller than 5 mass %, polyimide is so poor as not to be industrially practical. Meanwhile, a polyimide of larger than 50 mass % is difficult to be dissolved. The concentration is more preferably not smaller than 10 mass % and not larger than 40 mass %.

A HFIP group-containing asymmetric polyimide of the present invention preferably has a weight-average molecular weight (hereinafter, sometimes referred to as "Mw") of not lower than 10,000, more preferably not lower than 20,000. An upper limit of the weight-average molecular weight is preferably not higher than 500,000, more preferably not higher than 300,000. When the weight-average molecular weight is lower than 10,000, the strength of a polymer membrane to be obtained is poor. When the weight-average molecular weight exceeds 500,000, a polymer solution to be obtained becomes so high in viscosity as to be hard to handle. A weight-average molecular weight discussed in this specification is calculated as a value converted with respect to polystyrene standard by gel permeation chromatography (hereinafter, sometimes referred to as "GPC") (The same applies to the present application). Conditions for the above-mentioned analysis will specifically be discussed in Examples of the present application.

6. Preparation of Solution of HFIP Group-containing Asymmetric Polyimide

The thus obtained solution of a HFIP group-containing asymmetric polyimide may be used for production of a gas separation membrane as it is. Additionally, for the purpose of removing a remaining monomer or oligomer contained in the solution of the HFIP group-containing asymmetric polyimide, the solution of the HFIP group-containing asymmetric polyimide may be added to a poor solvent such as water and alcohol to precipitate the HFIP group-containing asymmetric polyimide, and then subjected to isolation purification and then dissolved in an organic solvent again thereby being prepared.

A usable organic solvent is required only to be one that can dissolve a HFIP group-containing asymmetric polyimide therein and therefore not particularly limited. For example, it is possible to cite: amide-based solvents such as N,N-dimethylformamide, N,N-dimethylacetamide, N,N-dimethylformamide, hexamethylphosphoric triamide and N-methyl-2-pyrrolidone; aromatic solvents such as benzene, anisole, diphenyl ether, nitrobenzene and benzonitrile; halogen-based solvents such as chloroform, dichloromethane, 1,2-dichloroethane and 1,1,2,2-tetrachloroethane; lactones such as γ-butyrolactone, γ-valerolactone, δ-valerolactone, γ-caprolactone, ε-caprolactone and α-methyl-γ-butyrolactone; phenols such as phenol, cresol, xylenol, catechol and chlorophenol; and the like. Additionally, a mixture solvent of these is usable too.

7. Production of Gas Separation Membrane

A gas separation membrane formed from a HFIP group-containing asymmetric polyimide of the present invention may be either a uniform membrane obtained by a wet film forming method where a thin membrane is produced with the aid of the property of a solvent evaporating from a solution of the HFIP group-containing asymmetric polyimide or an asymmetric membrane obtained by other method to have a dense layer and a porous layer.

[Uniform Membrane]

A uniform membrane is obtained in such a manner as to apply a solution of the HFIP group-containing asymmetric polyimide to a substrate (a glass substrate or the like) by a spin coater, applicator or the like in a wet condition and then heat the substrate in a dried gas such as air, nitrogen and argon to evaporate a solvent and then peel a membrane from the glass substrate. The uniform membrane can be obtained also by using a solution of a HFIP group-containing asymmetric polyamic acid instead of a solution of the HFIP group-containing asymmetric polyimide, in which method the polyamic acid solution is applied to a substrate according to the above-mentioned procedures and then heated to be imidized.

For using the uniform membrane as a gas separation membrane, the thickness of the uniform membrane is preferably not less than 5 µm and not more than 1 mm. A membrane of 5 µm or less thickness is difficult to be manufactured and easily broken. A membrane of 1 mm or more thickness has difficulty in permeating gases. The thickness is more preferably 10 to 200 µm.

[Asymmetric Membrane]

An asymmetric membrane formed having a dense layer and a porous layer can be formed by the above-mentioned method. Additionally, the asymmetric membrane can be obtained also by using a polyamic acid solution instead of the polyimide solution, in which an asymmetric membrane is formed and then heated to be imidized.

In the asymmetric membrane, the dense layer has different permeation rates according to the kind of gas so as to exhibit a selective gas separation function against a mixture gas. On the other hand, the porous layer functions as a support member for maintaining the shape of the membrane.

An asymmetric membrane to be used as the gas separation membrane of the present invention and formed including a HFIP group-containing asymmetric polyimide may have either a smooth shape or a hollow fiber shape.

A dense layer preferably has a thickness of not less than 10 nm and not more than 10 μm. When the thickness is less than 10 nm, the layer is difficult to be formed and therefore not practical. When the thickness is more than 10 μm, permeation of gas becomes difficult. The thickness is more preferably not less than 30 nm and not more than 1 μm.

A porous layer having the shape of a smooth layer preferably has a thickness of not less than 5 μm and not more than 2 mm. When the thickness is less than 5 μm, the layer is difficult to be formed and therefore not practical. When the thickness is more than 2 mm, permeation of gas becomes difficult. The thickness is more preferably not less than 10 μm and not more than 500 μm. In the case of the shape of hollow fiber, the internal diameter is not less than 10 μm and not more than 4 mm, preferably not less than 20 μm and not more than 1 mm. The outer diameter is not less than 30 μm and not more than 8 mm, preferably not less than 50 μm and not more than 1.5 mm. In the case of the shape of hollow fiber, it is preferable that the dense layer is disposed outside.

As a coagulation liquid used at the time of producing the asymmetric membrane, water or a mixture solvent of water and an organic solvent is preferably used. The mixture solvent contains water in an amount of 40 mass % or more, preferably 50 mass % or more. The organic solvent is exemplified by alcohols such as methanol, ethanol and isopropanol and ketones such as acetone, methyl ethyl ketone and diethyl ketone. If water or a water mixture solvent is used as a coagulation liquid, the manufacturing facility is not required to be exprosion-proof one and therefore results in cost reduction.

[Coagulation Liquid]

A HFIP group-containing asymmetric polyimide used for the gas separation membrane of the present invention is particularly easily dissolved in amide-based solvents such as N,N-dimethylacetamide, N,N-dimethylformamide and N-methyl-2-pyrrolidone and lactones such as γ-butyrolactone and γ-valerolactone by virtue of the effect of the contained HFIP group (i.e., polar group), in which it is easy to produce a uniform membrane having a desired thickness and it is easy to produce an asymmetric membrane by using a water-based coagulation liquid.

Particularly, in manufacturing an asymmetric membrane, a desired dense layer can be produced by changing the distance between an outlet and a coagulation bath (or by simultaneously discharging a dried air, a water-based coagulation liquid or the like into the inside of the outlet, in the case of discharging the polymer into the shape of hollow fiber). By modifying the kind of the organic solvent in the coagulation bath, it becomes possible to form a porous layer having desired pore diameter, pore distribution and thickness.

A membrane treated with a coagulation liquid is preferably used after being dried by heat treatment. The temperature of heat treatment is preferably not higher than the glass transition temperature of polyimide in order not to cause melting.

[Silicone Resin Coating]

For the purpose of repairing surface defects on the produced gas separation membrane, a silicone resin may be coated on the surface of the separation membrane. As a coating method, known coating methods such as spin coating, coating by an applicator, immersion coating and the like are usable.

A silicone resin is exemplified by generally known silicones such as dimethyl silicone, a phenyl group-containing silicone, a vinyl group-containing silicone, a Si—H group-containing silicone, a trifluoropropyl group-containing silicone, a silanol group-containing silicone, an amino group-containing silicone, an epoxy group-containing silicone, a methacrylic groups-containing silicone, an acrylic group-containing silicone and the like. These are commercially available and exemplified by DMS series, PDV series, VDT series, series, FMV series, HMS series, DMS series, HPM series, FMS series, SQO series, AMS series, MCR series, ECMS series, RMS series and the like available from Gelest, Inc.

8. Combined Use of Epoxy Compound

A polymer containing a repeating unit represented by the general formula (1) may be mixed with an epoxy compound and then heated or irradiated with light to be cured thereby serving as a cured membrane, for the purpose of improving the mechanical strength and the plasticization resistance, as the gas separation membranes discussed in Inventions 7 to 10. The cured membrane can be applied to the above-mentioned uniform membrane and asymmetric membrane.

As an epoxy compound, it is possible to cite epoxy compounds obtained by bringing phenol novolac resin, cresol novolac resin, aromatic hydrocarbon formaldehyde resin-modified phenol resin, dicyclopentadiene-modified phenol resin, phenolaralkyl resin, cresolaralkyl resin, naphtholaralkyl resin, biphenyl-modified phenolaralkyl resin, phenol trimethylolmethane resin, tetraphenylolethane resin, naphthol novolac resin, naphthol-phenol co-condensation novolac resin, naphthol-cresol co-condensation novolac resin, biphenyl-modified phenol resin, biphenyl-modified naphthol resins or aminotriazine-modified phenol resin into contact with epichlorohydrin thereby being modified with epoxy group.

These are commercially available and exemplified by a bisphenol A type epoxy resin (available from DIC Corporation under the trade name of Epiclon 840), a bisphenol F type epoxy resin (available from ADEKA Corporation under the trade name of Adekaresin EP-4901), cresol novolac type epoxy resins (available from DIC Corporation under the trade name of Epiclon N-600 series), dicyclopentadiene type resin available from DIC Corporation under the trade name of Epiclon HP-7200 series), triazine type resins (available from Nissan Chemical Industries, Ltd. under the trade name of TEPIC series) and the like.

An epoxy compound represented by general formula (12) is synthesized from a corresponding alcohol and epichlorohydrin.

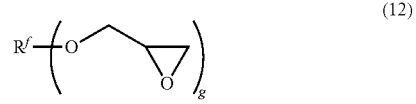

(12)

(In the formula (12), $R^f$ is an organic group having a valence of "g" and formed by removing "g" hydrogen atoms from an alkane or an aromatic or alicyclic ring, and may contain an oxygen atom, sulfur atom or nitrogen atom in its structure, wherein a part of hydrogen atoms may be substituted with fluorine atom, chlorine atom, alkyl group or fluoroalkyl group. "g" is an integer of 1 to 4.)

The alcohol is exemplified by 1,4-cyclohexanediol, 1,3-adamantanediol, catechol, 1,3-benzenediol, 2,2'-dihydroxybiphenyl, 4,4'-dihydroxybiphenyl, 2,2'-methylenediphenol, 4,4'-methylenediphenol, ethylene glycol, propylene glycol, 2,2-bis(4-hydroxyphenyl)-propane, 2,2-bis(4-hydroxyphenyl)-3-methylpropane, 2,2-bis(4-hydroxyphenyl)-butane, 3,3-bis(4-hydroxyphenyl)-pentane, 2,2-bis(4-hydroxyphenyl)-4-methylpentane, 3,3-bis(4-hydroxyphenyl)-hexane, 2,2-bis(3-chloro-4-hydroxyphenyl)-propane, 2,2-bis(3,5-dichloro-4-hydroxyphenyl)-propane, 2,2-bis(3-bromo-4-hydroxyphenyl)-propane, 2,2-bis(3,5-dibromo-4-hydroxyphenyl)-propane, 2,2-bis(3-methyl-4-hydroxyphenyl)-propane, 2,2-bis(4-hydroxyphenyl)-1,1,1,3,3,3-hexafluoropropane, 2,6-dihydroxynaphthalene, 2,3-dihydroxynaphthalene, 2,7-dihydroxynaphthalene, 1,4-dihydroxynaphthalene, 1,5-dihydroxynaphthalene, 2,3-dihydroxypyridine, 2,4-dihydroxypyridine, 4,4'-dihydroxydiphenyl ether, 4,4'-dihydroxydiphenyl sulfide, 4,4'-dihydroxydiphenyl sulfoxide, 4,4'-dihydroxydiphenyl sulfone, 4,4'-dihydroxybenzophenone, 1,4-dihydroxy hexane, 2,2-bis(4-hydroxycyclohexyl)-propane, 1,1'-methylenedi-2-naphthol, 4,4',4''-trihydroxytriphenylmethane, 1,1,1-tris(4-hydroxyphenyl) ethane and α,α,α'-tris(4-hydroxyphenyl)-1-ethyl-4-isopropylbenzene.

As the alcohol, it is also possible to use alcohol of a HFIP group contained in a repeating unit represented by formula (1).

At the time of producing a gas separation membrane of Inventions 7 to 10, these epoxy compounds may be used in combination with a curing agent for epoxy resin. The curing agent is exemplified by amine-based compounds, acid anhydride-based compounds, amide-based compounds, phenol-based compounds, mercaptan-based compounds, imidazole-based compounds, polysulfide resin-based compounds and phosphorous-based compounds. More specifically, it is possible to cite: heat curing agents such as diaminodiphenyl-methane, diaminodiphenyl sulfone, diethylenetriamine, triethylenetetramine, polyalkylene glycol polyamine, phthalic anhydride, trimellitic anhydride, pyromellitic anhydride, maleic anhydride, tetrahydrophthalic anhydride, methyltetrahydrophthalic anhydride, methyl nadic anhydride, hexahydrophthalic anhydride, methylhexahydrophthalic anhydride, 2-methylimidazole, triphenyl phosphine, 2-ethyl-4-methylimidazole, $BF_3$ amine complexes and guanidine derivatives; and ultraviolet curing agents such as diphenyliodonium hexafluorophosphate and triphenylsulfonium hexafluorophosphate.

The mixing ratio between a polymer containing a repeating unit represented by general formula (1) and an epoxy compound is a mass ratio (polymer:epoxy compound) of 10:90 to 98:2, preferably 50:50 to 95:5.

The mixing ratio between an epoxy compound and a curing agent for epoxy resin is a mass ratio of 70:30 to 99.5:0.5, preferably 90:10 to 99:1.

At some midpoint in process for producing the gas separation membrane, these may be applied to a glass or silicon substrate and then heated or irradiated with ultraviolet rays (UV) by ultraviolet lamp or the like so as to be cured, thereby producing a gas separation membrane cured by cross-linking. Organic solvents are usable without particular limitation so long as a composition containing a HFIP group-containing asymmetric polyimide having a repeating unit represented by general formula (1) and the above-mentioned epoxy resin as the primary components can be dissolved therein. Concrete examples are amide-based solvents such as N,N-dimethylformamide, N,N-dimethylacetamide, N-methylformamide, hexamethylphosphoric triamide and N-methyl-2-pyrrolidone, and additionally, cyclohexanone, propylene glycol monomethyl ether acetate and γ-butyrolactone.

EXAMPLES

Hereinafter the present invention will specifically be explained with reference to examples; however, the present invention is not limited by these examples.

[Preparation of Polyimide Membrane]

Preparation of a membrane of a HFIP group-containing asymmetric polyimide, for use in a gas separation membrane will be discussed.

A 200 mL three-neck flask having a nitrogen-introducing column and a reflux condenser was charged with 2.01 g (3.78 mmol) of HFA-3,4'-ODA as shown below, 1.68 g (3.78 mmol) of 6FDA and 14 g of N,N-dimethylacetamide and then stirred in an atmosphere of nitrogen at room temperature for 18 hours. Thereafter, 0.66 g (8.32 mmol) of pyridine and 0.77 g (7.56 mmol) of acetic anhydride were added thereto and then stirred at room temperature for 3 hours. A thus obtained reaction liquid was increased in temperature to 200° C. and then stirred for 6 hours, followed by being cooled to room temperature, thereby obtaining a uniform N,N-dimethylacetamide solution in which Polyimide 1 was dissolved. The Mw value of Polyimide 1, calculated by measuring the solution by GPC was 28,000 (where an apparatus available from TOSOH CORPORATION under the trade name of HLC-8320 was used, a solvent was tetrahydrofuran, and conversion was conducted with respect to polystyrene standard. The same applied to the following Examples).

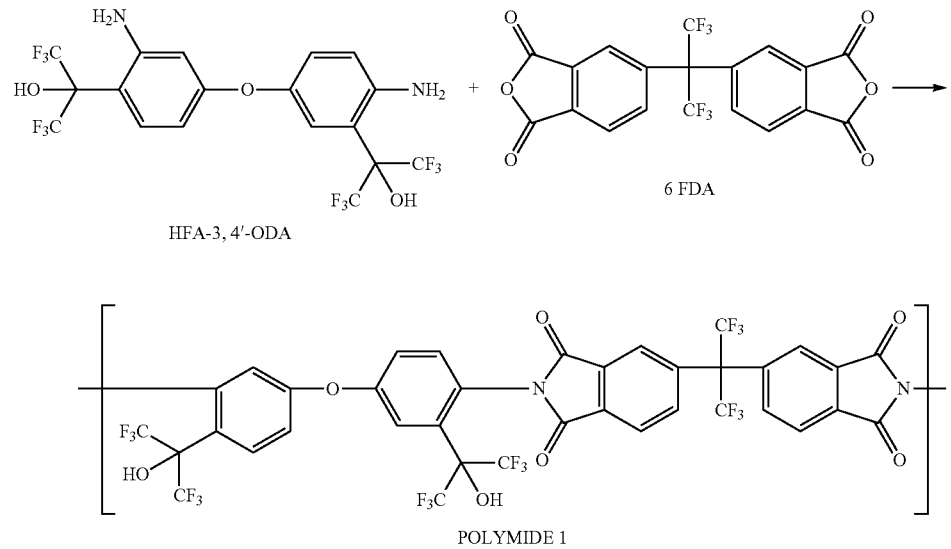

The N,N-dimethylacetamide solution was applied onto a glass substrate, followed by spin coating by using a spin coater under an application condition of a rotation speed of 1000 rpm and 30 seconds of retention time. A thus obtained glass substrate was heat-treated in an atmosphere of nitrogen at 200° C. for 1 hour and then a membrane was peeled from the glass substrate, thereby obtaining a membrane formed from Polyimide 1, i.e., a membrane of Polyimide 1 having a HFIP group and an asymmetric structure (hereinafter, sometimes referred to as "Polyimide Membrane 1"). As a result of measuring the membrane thickness, it was confirmed to be 25 µm.

Then, a series of diamine compounds containing a HFIP group (HFA-3,4'-MDA, HFA-2,4'-ODA) as follows:

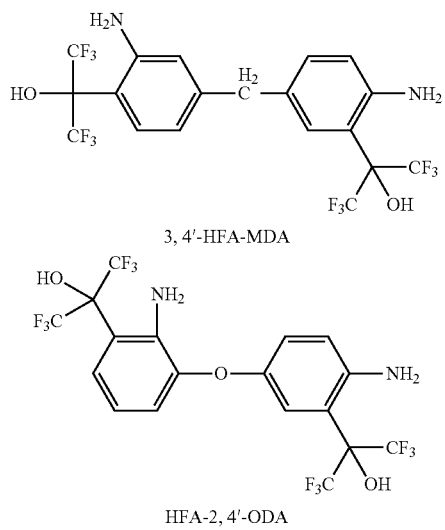

were reacted with tetracarboxylic dianhydrides (PMDA, BPDA, BTDA, DSDA, ODPA, 6FDA) as follows:

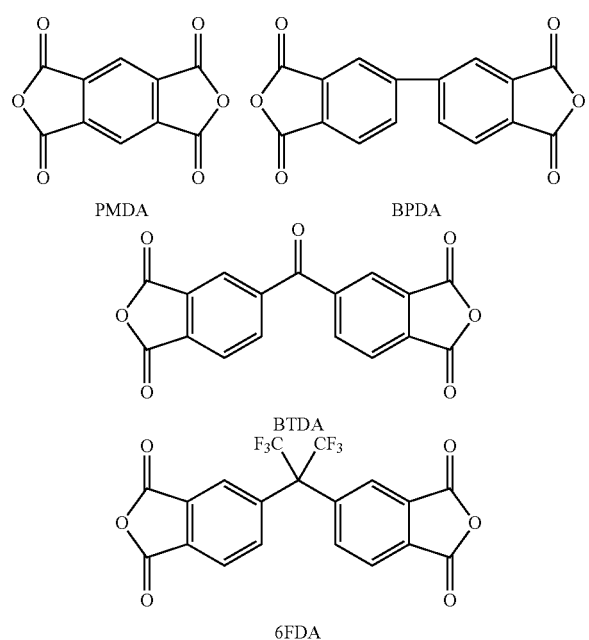

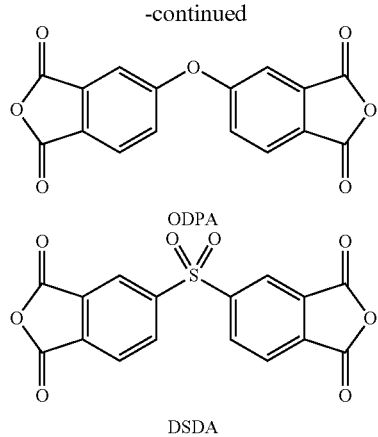

and then the above-mentioned procedures were repeated thereby obtaining Polyimide Membranes 2 to 9 formed respectively from Polyimides 2 to 9. The substrate compounds and the membrane thicknesses of Polyimide Membranes 2 to 9 are shown in Table 1-1 and the Mw values of Polyimides 2 to 9 are shown in Table 1-2.

TABLE 1-1

| Polyimide Membrane | Diamine Compound | Tetracarboxylic Dianhydride | Membrane Thickness |
|---|---|---|---|
| Polyimide Membrane 2 | HFA-3,4'-ODA | BPDA | 35 µm |
| Polyimide Membrane 3 | HFA-3,4'-ODA | BTDA | 40 µm |
| Polyimide Membrane 4 | HFA-3,4'-ODA | ODPA | 28 µm |
| Polyimide Membrane 5 | HFA-3,4'-MDA | PMDA | 25 µm |
| Polyimide Membrane 6 | HFA-3,4'-MDA | DSDA | 32 µm |
| Polyimide Membrane 7 | HFA-3,4'-MDA | 6FDA | 31 µm |
| Polyimide Membrane 8 | HFA-2,4'-ODA | 6FDA | 45 µm |
| Polyimide Membrane 9 | HFA-2,4'-ODA | ODPA | 40 µm |

TABLE 1-2

| Polyimide | Mw |
|---|---|
| Polyimide 2 | 35,000 |
| Polyimide 3 | 31,000 |
| Polyimide 4 | 29,000 |
| Polyimide 5 | 41,000 |
| Polyimide 6 | 43,000 |
| Polyimide 7 | 38,000 |
| Polyimide 8 | 30,000 |
| Polyimide 9 | 29,000 |

Then, a series of diamine compounds containing a HFIP group (HFA-3,4'-ODA, HFA-3,4'-MDA) and a series of tetracarboxylic dianhydrides (6FDA, BPDA, BTDA, DSDA) were combined and polymerized. To a N,N-dimethylacetamide solution obtained after the reaction, Epoxy Resin 1 or 2 and triphenyl phosphine as a curing agent (in an amount of 1 mass % relative to the epoxy resin) were added in certain amounts to produce polyimide of each Example. The polyimides were formed into membranes thereby obtaining Polyimide Membranes 10 to 13. The substrate compounds and the membrane thicknesses of Polyimide Membranes 10 to 13 are shown in Table 2.

Epoxy Resin 1: Bisphenol A type epoxy resin (available from Mitsubishi Chemical Corporation under the trade name of JER828)

Epoxy Resin 2: Cresol novolac epoxy resin (available from Sigma-Aldrich, Catalog No. 408042)

TABLE 2

| Polyimide Membrane | Diamine Compound | Tetracarboxylic Dianhydride | Epoxy Resin | Membrane Thickness |
|---|---|---|---|---|
| Polyimide Membrane 10 | HFA-3,4'-ODA | BTDA | Epoxy Resin 1 (10) | 30 μm |
| Polyimide Membrane 11 | HFA-3,4'-ODA | 6FDA | Epoxy Resin 2 (10) | 40 μm |
| Polyimide Membrane 12 | HFA-3,4'-MDA | BPDA | Epoxy Resin 1 (10) | 32 μm |
| Polyimide Membrane 13 | HFA-3,4'-MDA | 6FDA | Epoxy Resin 2 (10) | 38 μm |

Note:
A parenthesized number in this table represents the mass of epoxy resin relative to the total mass (regarded as 100) of diamine compound and tetracarboxylic dianhydride.

[Evaluation of Polyimide Membrane 1]

On Polyimide Membrane 1, measurement of the gas permeability coefficient and evaluation of the separation performance were conducted. A method of measuring the gas permeability coefficient of a gas separation membrane will be discussed below.

The gas permeability coefficient was measured upon disposing a gas separation membrane having a membrane area of 7 cm$^2$ on a cell formed of stainless steel, according to a differential-pressure method discussed in Part 1 of Japanese Industrial Standard JIS K 7126-1 (2006) "Plastics—Film and sheeting—Determination of gas-permeation rate".

More specifically, helium (He), carbonic acid gas ($CO_2$), oxygen gas ($O_2$), nitrogen gas ($N_2$) and methane gas ($CH_4$) were used as sample gases under a condition of a temperature of 23° C. thereby measuring the permeability coefficient and the separation performance (a ratio among the permeability coefficients of each of the gases) of each of the gases according to JIS K 7126-1 (2006).

A result of measuring the gas permeability coefficient of Polyimide Membrane 1 according to the above-mentioned JIS K 7126-1 (2006) is shown in Table 3, and a result of evaluating the separation performance is shown in Table 4.

TABLE 3

Result of Measuring Gas Permeability Coefficient

Permeability Coefficient
(unit: Barrer)
(1 Barrer = 10$^{-10}$ cm$^3$ (STP) cm/cm$^2$ sec cmHg)

| | He | $CO_2$ | $O_2$ | $N_2$ | $CH_4$ |
|---|---|---|---|---|---|
| Polyimide Membrane 1 | 135 | 85 | 13 | 2.7 | 1.8 |

TABLE 4

Result of Evaluating Separation Performance

Separation Performance (unit: None)

| | $CO_2/CH_4$ | $CO_2/N_2$ | $He/N_2$ | $He/CH_4$ |
|---|---|---|---|---|
| Polyimide Membrane 1 | 47 | 31 | 50 | 75 |

Comparative Example 1

Comparisons between Polyimide Membrane 1 and Conventional Resin

Then, comparisons of gas permeability coefficient and gas separation performance were made between Polyimide Membrane 1 and a fluorine-containing polyimide membrane not containing a HFIP group, the fluorine-containing polyimide membrane being out of the scope of the present invention and represented by the following structural formula (Comparative Example 1).

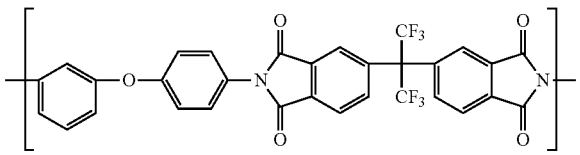

Polyimide Membrane of Comparative Example 1

Table 5 shows results of measuring the gas permeability coefficients that the polyimide membrane formed from the fluorine-containing polyimide of Comparative Example 1 has with regard to $CO_2$, $O_2$, $N_2$ and $CH_4$, while Table 6 shows results of measuring the separation performance of the membrane of Comparative Example 1.

If comparisons are made between Tables 3 and 5, the values of the gas permeability coefficient about $CO_2$, $O_2$, $N_2$ and $CH_4$ of the gas separation membrane formed from Polyimide Membrane 1 of Example 1 (i.e., the membrane of a HFIP group-containing asymmetric polyimide of the present invention) are found to be larger than those of the gas permeability coefficient about $CO_2$, $O_2$, $N_2$ and $CH_4$ of the fluorine-containing conventional polyimide membrane discussed in Comparative Example 1 not included in the scope of the present invention. With this, it is confirmed that Polyimide Membrane 1 of Example 1 of the present invention was superior in gas separation performance.

As shown in Table 6, a gas separation membrane of Example 2 of the present invention, obtained from polyimide having a HFIP group and an asymmetric structure, is superior to the gas separation membrane of Comparative Example 1 in separation performance represented by $CO_2/CH_4$ or $CO_2/N_2$

TABLE 5

| | Permeability Coefficient (unit: Barrer) (1 Barrer = $10^{-10}$ cm$^3$ (STP) cm/cm$^2$ sec cmHg) | | | |
|---|---|---|---|---|
| | $CO_2$ | $O_2$ | $N_2$ | $CH_4$ |
| Comparative Example 1 | 6 | 1.7 | 0.28 | 0.15 |

TABLE 6

| | Separation Performance (unit: none) | |
|---|---|---|
| | $CO_2/CH_4$ | $CO_2/N_2$ |
| Polyimide Membrane 1 | 47 | 31 |
| Comparative Example 1 | 40 | 21 |

[Evaluation of Polyimide Membranes 2 to 13]

By the same evaluation method as for Polyimide Membrane 1, the separation performances of Polyimide Membranes 2 to 13 were measured. As a result, their $CO_2$ permeability coefficients were so high as to be 30 Barrer or more, with which these were confirmed to be superior in performance to the polyimide membrane of Comparative Example 1.

Industrial Applicability

A gas separation membrane formed from a membrane of a HFIP group-containing asymmetric polyimide of the present invention has a permeation rate (a gas permeability coefficient) which dramatically varies according to the kind of gas, and excellent in gas separation performance. Hence the membrane can be preferably applied to a technique of separating carbon dioxide from liquefied natural gas and the like and fixing it, and preferably used as a water/ethanol separation membrane provided for the purpose of recovering a fuel-use ethanol, or the like.

What is claimed is:

1. A gas separation membrane, comprising:
a polyimide structure that contains a repeating unit represented by general formula (1):

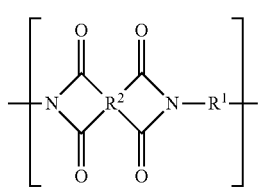

(1)

wherein R$^1$ is a divalent organic group and R$^2$ is a tetravalent organic group; and wherein R$^1$ is a divalent organic group represented by general formula (2):

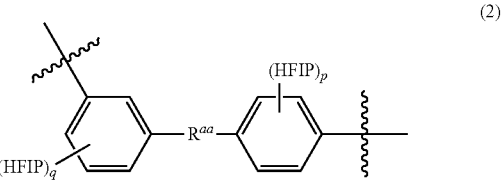

(2)

wherein R$^{aa}$ is a single bond, an oxygen atom, a sulfur atom, —SO$_2$— group, —CH$_2$ group, —C(=O)— group, —C(CH$_3$)$_2$— group, —C(CH$_3$)(CH$_2$CH$_3$)— group, —C(CF$_3$)$_2$— group, —CH(CH$_3$)— group, —CH(OH)— group, —NH— group or a divalent organic group formed by removing any two hydrogen atoms from a C$_3$-C$_{12}$ alicyclic hydrocarbon or C$_6$-C$_{25}$ aromatic hydrocarbon; wherein HFIP represents a —C(CF$_3$)$_2$OH group; wherein "p" and "q" mutually independently represent an integer of 0 to 2 such that 1≤p+q≤4; wherein a straight line that intersects with a wiggly line represents a bonding moiety; or R$^1$ is a divalent organic group represented by general formula (3):

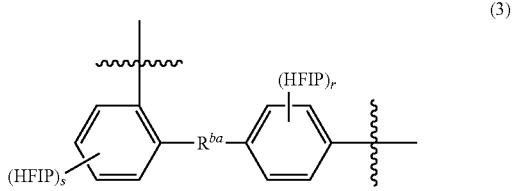

(3)

wherein R$^{ba}$ is a single bond, an oxygen atom, a sulfur atom, —SO$_2$— group, —CH$_2$— group, —C(=O)— group, —C(CH$_3$)$_2$— group, —C(CH$_3$)(CH$_2$CH$_3$)— group, —C(CF$_3$)$_2$— group, —CH(CH$_3$)— group, —CH(OH)— group, —NH— group or a divalent organic group formed by removing any two hydrogen atoms from a C$_3$-C$_{12}$ alicyclic hydrocarbon or C$_6$-C$_{25}$ aromatic hydrocarbon; wherein HFIP represents a —C(CF$_3$)$_2$OH group; wherein "r" and "s" mutually independently represent an integer of 0 to 2 such that 1≤r+s≤4; and wherein a straight line that intersects with a wiggly line represents a bonding moiety.

2. A gas separation membrane as claimed in claim 1, wherein the divalent organic group represented by general formula (2) is a divalent organic group represented by general formula (4):

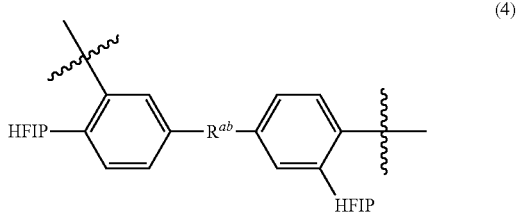

(4)

wherein R$^{ab}$ is a single bond, an oxygen atom, a sulfur atom, —SO$_2$— group, —CH$_2$— group, —C(=O)— group, —C(CH$_3$)$_2$— group, —C(CH$_3$)(CH$_2$CH$_3$)— group, —C(CF$_3$)$_2$— group, —CH(CH$_3$)— group, —CH(OH)— group, —NH— group or a divalent organic group formed by removing any two hydrogen atoms from a C$_3$-C$_{12}$ alicyclic hydrocarbon or C$_6$-C$_{25}$ aromatic hydrocarbon; wherein HFIP represents a —C(CF$_3$)$_2$OH group; and wherein a straight line that intersects with a wiggly line represents a bonding moiety.

3. A gas separation membrane as claimed in claim 1, wherein the divalent organic group represented by general formula (2) is any one of divalent organic groups represented by formulas (4-1) and (4-2):

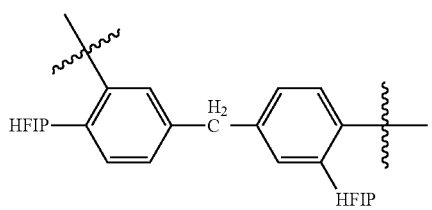
(4-1)

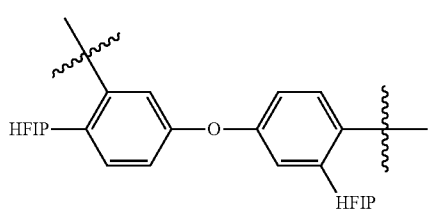
(4-2)

wherein HFIP represents a —C(CF$_3$)$_2$OH group; and wherein a straight line that intersects with a wiggly line represents a bonding moiety.

4. A gas separation membrane as claimed in claim 1, wherein the divalent organic group represented by general formula (3) is any one of divalent organic groups represented by formula (5):

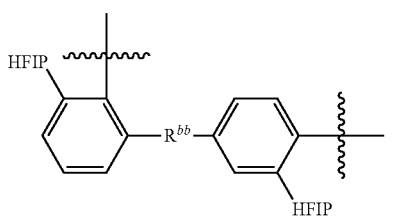
(5)

wherein R$^{bb}$ is a single bond, an oxygen atom, a sulfur atom, —SO$_2$— group, —CH$_2$— group, —C(=O)— group, —C(CH$_3$)$_2$— group, —C(CH$_3$)(CH$_2$CH$_3$)— group, —C(CF$_3$)$_2$— group, —CH(CH$_3$)— group, —CH(OH)— group, —NH— group or a divalent organic group formed by removing any two hydrogen atoms from a C$_3$-C$_{12}$ alicyclic hydrocarbon or C$_6$-C$_{25}$ aromatic hydrocarbon; wherein HFIP represents a —C(CF$_3$)$_2$OH group; and wherein a straight line that intersects with a wiggly line represents a bonding moiety.

5. A gas separation membrane as claimed in claim 1, wherein the divalent organic group represented by general formula (3) is any one of divalent organic groups represented by formulas (5-1) and (5-2):

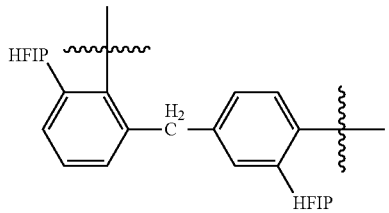
(5-1)

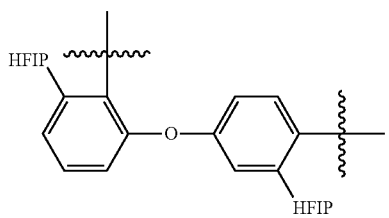
(5-2)

wherein HFIP represents a —C(CF$_3$)$_2$OH group; and wherein a straight line that intersects with a wiggly line represents a bonding moiety.

6. A gas separation membrane as claimed in claim 1, wherein R$^2$ is any one of tetravalent organic groups represented by formulas (6) to (11):

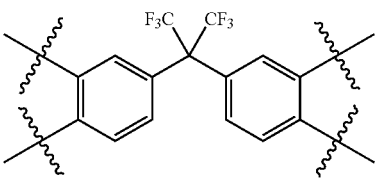
(6)

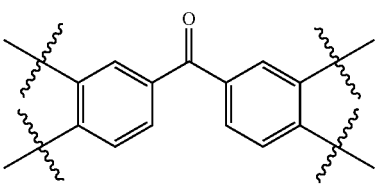
(7)

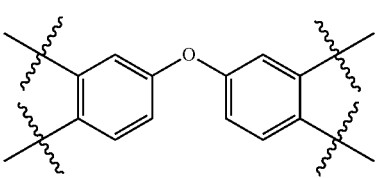
(8)

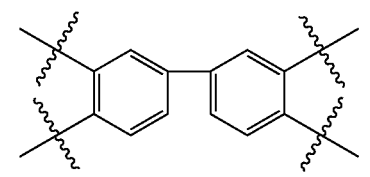
(9)

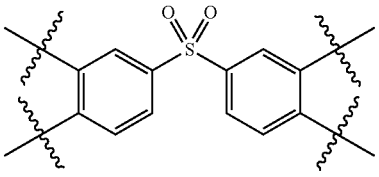
(10)

-continued (11)

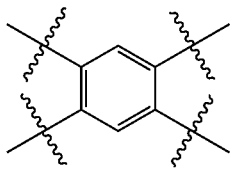

wherein a straight line that intersects with a wiggly line represents a bonding moiety.

7. A gas separation membrane as claimed in claim 1, wherein a hydrogen atom of —OH group that a HFIP group contained in $R^1$ has is substituted with a glycidyl group.

8. A gas separation membrane as claimed in claim 7, wherein the glycidyl group forms crosslinking in a manner that its cyclic ether moiety is opened.

9. A gas separation membrane as claimed in claim 1, obtained by being mixed with an epoxy compound and then heated.

10. A gas separation membrane as claimed in claim 9, wherein the epoxy compound is represented by general formula (12):

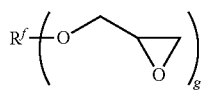

(12)

wherein $R^f$ is an organic group having a valence of "g" and formed by removing any "g" hydrogen atoms from an alkane or an aromatic or alicyclic ring, and may contain an oxygen atom, sulfur atom or nitrogen atom in its structure, wherein a part of hydrogen atoms may be substituted with fluorine atom, chlorine atom, alkyl group or fluoroalkyl group; and wherein "g" is an integer of 1 to 4.

11. A polyimide comprising:
a repeating unit represented by general formula (1):

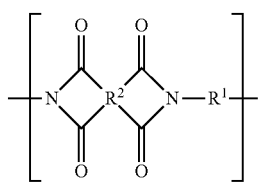

(1)

wherein $R^1$ is a divalent organic group and $R^2$ is a tetravalent organic group,
wherein $R^1$ is a divalent organic group represented by general formula (2):

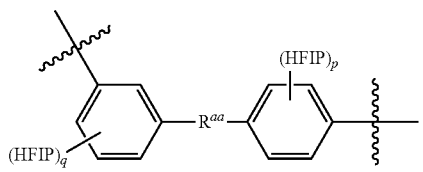

(2)

wherein $R^{aa}$ is a single bond, an oxygen atom, a sulfur atom, —$SO_2$— group, —$CH_2$— group, —C(=O)— group, —$C(CH_3)_2$— group, —$C(CH_3)(CH_2CH_3)$— group, —$C(CF_3)_2$— group, —$CH(CH_3)$— group, —CH(OH)— group, —NH— group or a divalent organic group formed by removing any two hydrogen atoms from a $C_3$-$C_{12}$ alicyclic hydrocarbon or $C_6$-$C_{25}$ aromatic hydrocarbon; wherein HFIP represents a —$C(CF_3)_2$OH group; wherein "p" and "q" mutually independently represent an integer of 0 to 2 such that 1≤p+q≤4 and wherein a straight line that intersects with a wiggly line represents a bonding moiety or
$R^1$ is a divalent organic group represented by general formula (3):

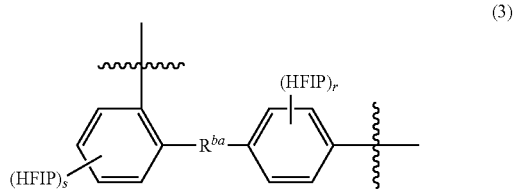

(3)

wherein $R^{ba}$ is a single bond, an oxygen atom, a sulfur atom, —$SO_2$— group, —$CH_2$— group, —C(=O)— group, —$C(CH_3)_2$— group, —$C(CH_3)(CH_2CH_3)$— group, —$C(CF_3)_2$— group, —$CH(CH_3)$— group, —CH(OH)— group, —NH— group or a divalent organic group formed by removing any two hydrogen atoms from a $C_3$-$C_{12}$ alicyclic hydrocarbon or $C_6$-$C_{25}$ aromatic hydrocarbon; wherein HFIP represents a —$C(CF_3)_2$OH group; wherein "r" and "s" mutually independently represent an integer of 0 to 2 such that 1≤r+s≤4; and wherein a straight line that intersects with a wiggly line represents a bonding moiety; and
wherein a hydrogen atom of —OH group that a HFIP group contained in $R^1$ has is substituted with a glycidyl group.

12. A cured product comprising:
a polyimide having a glycidyl group, as claimed in claim 11,
wherein the glycidyl group forms crosslinking in a manner that its cyclic ether moiety is opened.

13. A cured product comprising:
a polyimide as claimed in claim 11; and
an epoxy compound,
wherein the cured product is obtained by mixing the polyimide with the epoxy compound and then by heating it.

14. A cured product as claimed in claim 13, wherein the epoxy compound is represented by general formula (12):

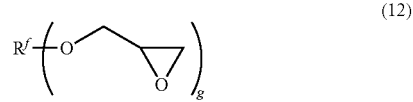

(12)

wherein $R^f$ is an organic group having a valence of "g" and formed by removing any "g" hydrogen atoms from an alkane or an aromatic or alicyclic ring, and may contain an oxygen atom, sulfur atom or nitrogen atom in its structure, wherein a part of hydrogen atoms may be substituted with fluorine atom, chlorine atom, alkyl group or fluoroalkyl group; and wherein "g" is an integer of 1 to 4.

* * * * *